United States Patent [19]
Goswami

[11] 3,983,294
[45] Sept. 28, 1976

[54] METHOD OF MAKING PLASTIC FOAM LAMINATES AND PRODUCT FORMED THEREBY

[75] Inventor: Jagadish C. Goswami, New City, N.Y.

[73] Assignee: Stauffer Chemical Company, Westport, Conn.

[22] Filed: June 23, 1975

[21] Appl. No.: 588,103

Related U.S. Application Data

[63] Continuation-in-part of Ser. No. 496,228, Aug. 9, 1974.

[52] U.S. Cl. ................................ 428/310; 156/242; 260/2.5 F; 260/2.5 FP; 526/80.71; 526/278; 428/315; 428/906; 428/921
[51] Int. Cl.² .................................... B32B 3/26
[58] Field of Search .......... 260/2.5 FP, 2.5 P, 80.71, 260/80.81, 2.5 R; 428/920, 906, 921, 310, 315; 427/373; 156/242

[56] References Cited

UNITED STATES PATENTS

| | | | |
|---|---|---|---|
| 2,964,799 | 12/1960 | Roggi et al. | 264/46.3 |
| 3,501,370 | 3/1970 | Juredine | 428/315 |
| 3,632,842 | 1/1972 | Forrest | 428/212 |
| 3,674,547 | 7/1972 | Noone | 428/311 |
| 3,726,839 | 4/1973 | Jin | 260/80.71 |
| 3,854,989 | 12/1974 | Golborn | 428/921 |
| 3,935,149 | 1/1976 | Kraft et al. | 260/80.71 |

*Primary Examiner*—William J. Van Balen
*Attorney, Agent, or Firm*—Richard P. Fennelly

[57] ABSTRACT

Plastic foam laminates are formed by heating a laminate of a base and a plastic film, said film comprising a vinyl chloride-vinyl acetate-bis(hydrocarbyl) vinylphosphonate suspension copolymer and a blowing agent, at a temperature of about 140°C. to about 160°C. The foam which is formed thereby has a fine, uniform cell quality.

29 Claims, No Drawings

METHOD OF MAKING PLASTIC FOAM LAMINATES AND PRODUCT FORMED THEREBY

RELATED APPLICATION

This is a continuation-in-part of U.S. application Ser. No. 496,228, filed Aug. 9, 1974.

TECHNICAL DESCRIPTION OF THE INVENTION

A method for forming plastic foam laminates is described in U.S. Pat. No. 2,964,799 to P. E. Roggi et al. wherein a vinyl chloride-vinyl acetate copolymer mass containing a blowing agent can be calendered at 150°C.–185°C. to fuse the resin and form a thin film on a fabric substrate, and this laminate can then be heated to 190°C.–255°C. whereby the film expands freely without disruption to form a blown sheet having a continuous surface. That patent mentions that use of resins which calender below the 160°–185°C. temperature range will give a poor foam quality in the final product.

This invention is a method for forming a foam by utilizing a resin formulation which calenders below the range set forth in the Roggi et al. patent, the foam formed thereby, and the resin formulation which is to be used in forming the foam.

The first step in the process of forming the laminate is the milling of a solid thermoplastic suspension copolymer which comprises from about 80% to about 90% by weight vinyl chloride, about 2% to about 15% by weight vinyl acetate, and about 2% to about 15% of a bis (hydrocarbyl) vinylphosphonate with an amount of blowing agent which is effective to foam the plastic film in the later heating step, which will be described in greater detail below, and, preferably, with from about 25% to about 50% by weight of plasticizer, based on the weight of the resin composition. The amount of plasticizer that is used allows for production of an expandable melt at the heating temperature used in the process. In addition to these components, the composition can also contain conventional amounts of the heat stabilizers, pigments, fillers, colorants or other functional additives known to persons of ordinary skill in the art.

If desired, the resin cmmposition can be easily flame retarded by using phosphate esters, e.g., tricresyl phosphate, 2,3-dibromopropyl phosphate, etc., either alone or in combination with antimony trioxide, hydrated alumina or any other flame retardant generally used in the plastics industry in amounts conventionally used in flame retarding polyvinyl chloride, e.g., about 2% to about 10% of the composition.

The term "bis (hydrocarbyl) vinylphosphonate" as used herein is intended to encompass vinylphosphonates having the structure:

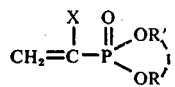

wherein X is selected from the group consisting of hydrogen, halogen, cyano, aryl, such as phenyl, $C_1$–$C_{18}$ alkyl and

wherein R and R' are hydrocarbyl and substituted hydrocarbyl groups consisting essentially of hydrogen and carbon and containing up to about 18 carbon atoms inclusive with the proviso that R and R' may be the same, different or conjoint, i.e., R and R' may form one single radical.

The use in this disclosure of the expression "hydrocarbyl" and "substituted hydrocarbyl" groups refers to the radicals obtained upon the removal of a hydrogen from a hydrocarbon or substituted hydrocarbon group which may be either an aliphatic or aromatic group. These hydrocarbyl groups may be substituted with any non-interfering groups, i.e., with any group which does not interfere with the polymerization of the bis-(hydrocarbyl) vinylphosphonate. Such substituent groups include, for example, chloro, bromo, fluoro, nitro, hydroxy, sulfone, ethoxy, methoxy, nitrile, ether, ester and keto groups and the like.

Illustrative of such groups as are represented by R and R' are alkyl or alkenyl groups, such as methyl, ethyl, propyl, butyl, pentyl, hexyl, nonyl, pentenyl, and hexenyl groups and all of their respective isomers; cycloalkyl or cycloalkenyl groups, such as cyclopropyl, cyclobutyl, cyclophenyl, cyclohexyl and cyclohexenyl groups and the like; while typical aryl groups represented by R and R' include phenyl, benzyl, phenethyl, tolyl and napthyl groups and the like.

Representative of the above depicted bis(hydrocarbyl) vinylphosphonates which may be used in preparing the fire retardant vinyl chloride copolymers of this invention are:

Bis(beta-chloroethyl) vinylphosphonate;
Bis(beta-chloropropyl) vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chloroethyl) 1-phenylvinylphosphonate;
Dimethyl vinylphosphonate;
Diethyl vinylphosphonate;
Bis(omega-chlorobutyl) vinylphosphonate;
Di-n-butyl vinylphosphonate
Di-isobutyl vinylphosphonate;
Bis(2-chloroisopropyl) 1-methylvinylphosphonate;
Diphenyl vinylphosphonate; and
Bis(2,3-dibromopropyl) vinylphosphonate.

It is, however, to be emphasized that it is preferred to employ bis(beta-chloroethyl) vinylphosphonate in preparing the copolymers of this invention since the latter monomer is a commercially available material and is lower in cost than any of the other above listed bis(hydrocarbyl) vinylphosphonates.

The preferred composition of the suspension copolymer of this invention is about 85% to about 87% vinyl chloride, about 3% to about 8% vinyl acetate and about 5% to about 7% bis (beta-chloroethyl) vinylphosphonate. Any of the copolymers suitable for use in the present invention are formed by subjecting the foregoing monomers to conventional suspension polymerization procedures which are well known to persons of ordinary skill in the art. Typically such procedures entail the use of from about 0.05% to about 1%, by weight of the monomers, of a suspending agent, e.g., methyl cellulose, hydroxyethyl cellulose, hydroxypropyl cellulose, carboxymethyl cellulose, talc, clay, polyvinyl alcohol, gelatine or the like, with from about 0.2% to about 1.0% by weight of the monomers, of a monomer-soluble initiator, e.g., azobisisobutyronitrile, lauroyl peroxide, benzoyl peroxide or isopropylperoxy dicarbonate, in an aqueous medium containing said monomers. The polymerization is conducted at about 45°C. to about 75°C. for a period of about 2 to 12 hours with agitation being applied throughout the reaction. The relative viscosity of the copolymers (1% in cyclohexanone at 25°C.) should range from about 1.7 to about 2.7.

The blowing agent which is used is present in an effective amount, e.g., preferably ranging from about 1% to about 20% by weight of the copolymer, most preferably from about 7.5% to about 10% by weight, and is one which decomposes at a temperature of from about 140° to about 160°C. The preferred blowing agent is 4,4' oxybis(benzenesulfonyl hydrazide) which is available from Uniroyal Chemical Div., under the trade name "Celogen OT".

The milling may be accomplished in an internal mixer, open roll mill, or both, at a temperature which is less than that required to decompose the blowing agent. The milled composition containing the copolymer is a unitary, solid mass, rather than particulate, and the composition is non-flowing and self-supporting at ordinary temperatures. The amount of plasicizer used should be from about 25 to about 50%, by weight, based on the weight of copolymer. Any conventional polyvinyl chloride plasticizer can be used. Conventional stabilizers, colorants, antioxidants, lubricants and other additives can also be included in conventional amounts in the composition.

The next step of the process involves the calendering of the milled copolymer-containing composition onto a suitable base. Flexible bases, such as a fabric base, are preferred. The calendering is accomplished by using a conventional calendar, e.g., a three or four roll calender, at a temperature sufficiently elevated to bring about substantial fusion of the resin so that a coherent, uniform film, is formed. The temperature should be about 110°C. to about 125°C., preferably about 115° to about 125°C. These temperatures are insufficient to cause decomposition of the blowing agent contained in the composition. The calendering step forms a film having a thickness of from about 10 to about 120 mils on the base. This product can be wound up into a roll, or transported or stored in any other convenient form, for an indefinite period of time.

Alternatively, the copolymer composition may first be calendered into a cohesive, unsupported film or sheet which is then combined with the flexible base to form a laminated construction by the use of an adhesive or by the application of heat and pressure. Typical adhesives are plastisols, latexes, solutions, dispersions or hot melts which are suitably formulated as is well known to those of ordinary skill in the art. The adhesive may be applied to the side to be laminated on either the flexible base or the unsupported film or sheet. The two components of the construction are then contacted with each other, and the adhesive is allowed to dry or cure thereby forming a permanently bonded laminate. If practical, the copolymer film or sheet may be placed on the flexible substrate and laminated thereto by the use of heat and pressure.

After the calendered base and copolymer composition is formed, it is then heated to a temperature of from about 140°C. to about 160°C. for a period of from about 5 to about 15 min. to decompose the blowing agent and thereby foam the composition containing the copolymer and blowing agents.

The following Examples illustrate the present invention:

EXAMPLE 1

This illustrates formation of a suspension copolymer suitable for use in forming the laminates of the present invention.

Deionized water (52 lbs. 13 oz.) and 32 grams of Methocel suspending agent solution were charged into a 10 gallon reactor. Vinyl acetate (2 lbs.) and bis (beta-chloroethyl) vinylphosphonate (1 lb. 11 oz.) were added followed by 5 grams of azobisisobutyronitrile catalyst (Vazo-52). The manhole of the reactor was closed, vacuum was twice applied, and the reactor was purged with nitrogen. The vinyl chloride monomer (24 lbs 8 oz.) was then charged into the reactor, and the mixture was stirred at 496 rpm. for about 30 minutes. The reactor was heated to 52°C. and was maintained at this temperature until the pressure dropped by 30 psi from the levels noted while the reaction was initiated. At this point 10 grams of 2,6-di-tert-butyl-4-methylphenol (Ionol) was added. The product was recovered by centrifuging in the presence of filter paper and was dried in an oven dryer.

EXAMPLE 2

A composition was formed by milling the ingredients listed in the Table for seven minutes (front roll: 245°F., 30 feet/min.; back roll: 250°F., 42 feet/min.):

| INGREDIENTS | AMOUNT (Parts by Weight) |
| --- | --- |
| 87% vinyl chloride: 7% vinyl acetate: 6% bis (beta-chloroethyl)vinyl-phosphonate copolymer* | 100 |
| Dioctyl Phthalate | 40 |
| Butyl Benzyl Phthalate | 15 |
| Epoxidized Soyabean oil | 5 |
| Stabilizer (ABC-2) | 3 |
| Filler (CaCO$_3$) | 10 |
| Pigment (TiO$_2$) | 2 |
| Lubricant (Stearic Acid) | 2.5 |
| Celogen-OT (4,4'-oxybis benzene sulfonyl hydrazide) | 8 |

*Relative viscosity: 2.17, made as described in Example 1.

EXAMPLE 3

Another formulation was milled according to Example 2 and contained the following:

| INGREDIENTS | AMOUNT (Parts By Weight) |
| --- | --- |
| Copolymer of Example 1 | 100 |
| Dioctyl Phthalate | 60 |
| Butyl Benzyl Phthalate | 20 |
| Epoxidized Soyabean Oil | 5 |
| Stabilizer (ABC-2) | 3 |
| Filler (CaCO$_3$) | 10 |
| Pigment (TiO$_2$) | 2 |
| Lubricant (Stearic Acid) | 2.5 |
| Celogen-OT(4,4'-oxybis benzene | |

EXAMPLES 4-6

These examples show use of polymer compositions falling outside the scope of the present invention and use of a blowing agent which does not decompose in the range of 140°C.–160°C. All milling conditions are the same as in Example 1.

EXAMPLE 4

| INGREDIENTS | AMOUNT (Parts By Weight) |
| --- | --- |
| 87% vinyl chloride: 7% vinyl acetate: 6% bis (beta-chloroethyl)vinyl- phosphonate copolymer* | 100 |
| Dioctyl Phthalate | 40 |
| Butyl Benzyl Phthalate | 15 |
| Epoxidized Soyabean Oil | 5 |
| Stabilizer (ABC-2) | 3 |
| Filler (CaCO₃) | 10 |
| Pigment (TiO₂) | 2 |
| Lubricant (Stearic Acid) | 2.5 |
| R-800 (Diisopropyl Azodiformate) | 8 |

*Relative Viscosity: 2.17

EXAMPLE 5

| INGREDIENTS | AMOUNT (Parts By Weight) |
| --- | --- |
| 85.5% vinyl chloride: 10.7% (beta-chloroethyl) vinyl- phosphonate: 3.8% propylene* | 100 |
| Dioctyl Phthalate | 25 |
| Butyl benzyl phthalate | 15 |
| Epoxidized Soyabean Oil | 5 |
| Stabilizer (ABC-2) | 3 |
| Filler (CaCO₃) | 10 |
| Pigment (TiO₂) | 2 |
| Lubricant (Stearic Acid) | 2.5 |
| Celogen-OT (4,4'-oxybis benzenesulfonyl hydrazide) | 8 |

*This copolymer at 60 parts per hundred plasticizer was too soft and could not be milled.

EXAMPLE 6

| INGREDIENTS | AMOUNT (Parts By Weight) |
| --- | --- |
| 90% vinyl chloride: 10% bis (beta-chloroethyl) vinyl- phosphonate* | 100 |
| Dioctyl Phthalate | 40 |
| Butyl benzyl phthalate | 15 |
| Epoxidized Soyabean Oil | 5 |
| Stabilizer (ABC-2) | 3 |
| Filler (CaCO₃) | 10 |
| Pigment (TiO₂) | 2 |
| Lubricant (Stearic acid) | 2.5 |
| Celogen-OT(4,4'oxybis benzene- sulfonyl hydrazide) | 8 |

*Relative Viscosity: 2.5.

EXAMPLE 7

Each of the five compositions in Examples 2–6 was laminated onto a fabric in a two roll mill. The laminated film was expanded by heating in a circulatory oven for five minutes at 320°F. The table sets forth the pre-expansion and post expansion characteristics.

| COMPOSITION | PRE-EXPANSION THICKNESS (MILS) | POST-EXPANSION THICKNESS (MILS) | BLOW-UP RATE* (%) | CELL QUALITY |
| --- | --- | --- | --- | --- |
| Ex. 2 | 80 | 205 | 300 | Fine & Uniform |
| Ex. 3 | 63 | 280 | 600 | Fine & Uniform |
| Ex. 4 | 74 | 135 | 210 | Coarse |
| Ex. 5 | 99 | 179 | 200 | Coarse |
| Ex. 6 | 98 | 187 | 210 | Coarse |

*Corrected for a fabric thickness of 20 mil.

What is claimed:

1. A method for making a plastic film laminate which comprises forming a laminate of a plastic film on a base, said film comprising a vinyl chloride-vinyl acetate-bis (hydrocarbyl) vinylphosphonate suspension copolymer and a blowing agent.

2. A method as claimed in claim 1 wherein the copolymer comprises about 80% to about 90% vinyl chloride, about 2% to about 15% vinyl acetate, and about 2% to about 15% bis (hydrocarbyl) vinylphosphonate.

3. A method as claimed in claim 1 wherein the amount of blowing agent in said film is about 1% to about 20%.

4. A method as claimed in claim 1 wherein the blowing agent decomposes at a temperature of about 140°C. to about 160°C.

5. A method as claimed in claim 1 which further comprises heating said film to cause decomposition of the blowing agent and formation of a plastic foam.

6. A method as claimed in claim 5 wherein the film is heated to a temperature of about 140°C. to about 160°C.

7. A method as claimed in claim 1 wherein the copolymer comprises about 85 to about 87% vinyl chloride, about 3% to about 8% vinyl acetate, and about 5% to about 7% bis (beta-chloroethyl) vinylphosphonate.

8. A method as claimed in claim 5 wherein the film is heated to a temperature of from about 140°C. to about 160°C.

9. A method as claimed in claim 1 wherein the plastic film is calendered at a temperature of from about 110°C. to about 125°C.

10. A method as claimed in claim 1 wherein the film is calendered at a temperature of from about 115°C. to about 125°C.

11. A method as claimed in claim 1 wherein the film comprises from about 25% to about 50% by weight, based upon the weight of copolymer, of a plasticizer.

12. A method as claimed in claim 1 wherein the film further comprises a flame retardant.

13. A plastic film laminate which comprises:
   a. a base; and
   b. a plastic film attached to said base, said film comprising a suspension copolymer of vinyl chloride, vinyl acetate and bis (hydrocarbyl) vinylphosphonate and a blowing agent.

14. A film laminate as claimed in claim 13 which comprises about 80% to about 90% by weight vinyl chloride, about 2% to about 15% by weight vinyl acetate, and about 2% to about 15% by weight bis (hydrocarbyl) vinylphosphonate, based upon the weight of the plastic film.

15. A film laminate as claimed in claim 13 which comprises about 85% to about 87% by weight vinyl chloride, about 3% to about 8% by weight vinyl acetate, and about 5% to about 7% by weight bis (beta-chloroethyl) vinylphosphonate, based on the weight of the plastic film.

16. A film laminate as claimed in claim 13 wherein the blowing agent decomposes at a temperature of about 140°C. to about 160°C.

17. A film laminate as claimed in claim 13 wherein the blowing agent is present at about 1% to about 20% by weight of the film.

18. A film laminate as claimed in claim 13 wherein the film comprises about 25% to about 50% by weight of a plasticizer based on the weight of the copolymer.

19. A film laminate as claimed in claim 13 which further comprises a flame retardant.

20. A plastic foam laminate comprising:
   a. a base; and
   b. a plastic foam attached to said base, said foam comprising a suspension copolymer of vinyl chloride, vinyl acetate and bis (hydrocarbyl) vinylphosphonate.

21. A foam laminate as claimed in claim 20 which comprises about 80 to about 90% by weight vinyl chloride, about 2 to about 15% by weight vinyl acetate and about 2% to about 15% by weight bis (hydrocarbyl) vinylphosphonate, based on the weight of the plastic foam.

22. A foam laminate as claimed in claim 20 which comprises about 85% to about 87% by weight vinyl chloride, about 3% to about 8% by weight vinyl acetate and about 5% to about 7% by weight bis (beta-chloroethyl) vinylphosphonate, based on the weight of the plastic foam.

23. A film laminate as claimed in claim 20 which further comprises a flame retardant.

24. A method as claimed in claim 1 wherein the laminate also contains an effective amount for plasticization of a plasticizer.

25. A film laminate as claimed in claim 13 wherein the laminate also contains an effective amount for plasticization of a plasticizer.

26. A suspension copolymer which comprises from about 80% to about 90%, by weight, vinyl chloride, from about 2% to about 15%, by weight, vinyl acetate, and from about 2% to about 15%, by weight, of a bis (hydrocarbyl) vinylphosphonate.

27. A copolymer as claimed in claim 26 wherein the vinyl chloride comprises about 85% to about 87%, by weight, the vinyl acetate comprises about 3% to about 8%, by weight, and the vinylphosphonate content comprises about 5% to about 7% by weight.

28. A copolymer as claimed in claim 26 wherein the vinyl chloride comprises about 87%, by weight, the vinyl acetate comprises about 7%, by weight, and the vinylphosphonate comprises about 6%, by weight.

29. A copolymer as claimed in claim 26 wherein the vinylphosphonate is bis (beta-chloroethyl) vinylphosphonate.

* * * * *